United States Patent
Bresniker et al.

(10) Patent No.: US 7,519,245 B2
(45) Date of Patent: Apr. 14, 2009

(54) MODULAR ARRAY COMPUTER WITH OPTICAL INTERCELL COMMUNICATIONS PATHWAYS

(75) Inventors: Kirk M. Bresniker, Roseville, CA (US); Richard A. Schumacher, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 65 days.

(21) Appl. No.: 11/590,393

(22) Filed: Oct. 31, 2006

(65) Prior Publication Data

US 2008/0298742 A1 Dec. 4, 2008

(51) Int. Cl.
G02B 6/12 (2006.01)

(52) U.S. Cl. .................................................... 385/14

(58) Field of Classification Search .................. 385/14, 385/15, 31
See application file for complete search history.

(56) References Cited

U.S. PATENT DOCUMENTS

| | | | |
|---|---|---|---|
| 4,063,083 A * | 12/1977 | Cathey et al. | 398/164 |
| 4,809,358 A * | 2/1989 | Fernstrom | 398/164 |
| 5,818,984 A * | 10/1998 | Ahmad et al. | 385/14 |
| 6,310,992 B1 * | 10/2001 | Gehrke et al. | 385/24 |
| 6,837,625 B2 | 1/2005 | Schott et al. | 385/69 |
| 6,962,511 B2 | 11/2005 | Gadir et al. | |
| 7,076,123 B2 | 7/2006 | Kirkpatrick et al. | |
| 7,097,365 B2 | 8/2006 | Cheng et al. | |
| 2004/0159777 A1 * | 8/2004 | Stone | 250/216 |

* cited by examiner

*Primary Examiner*—Sarah Song

(57) ABSTRACT

The present invention provides an array of computer cells in which adjacent computer cells communicate over optical pathways.

11 Claims, 3 Drawing Sheets

MODULAR ARRAY COMPUTER WITH OPTICAL INTERCELL COMMUNICATIONS PATHWAYS

BACKGROUND OF THE INVENTION

Herein, related art may be discussed to put the invention in context. Related art labeled "prior art" is admitted prior art; related art not labeled "prior art" is not admitted prior art.

Computer purchases for large enterprises can be challenging as computing needs are difficult to predict and tend to change, e.g., grow, over time. As computing power tends to become less expensive overtime, purchasing enough hardware for long-term future needs is usually not economical. Expandable systems are widely available, but are still costly as provisions for expansion, e.g., slots and electrical connectivity typically must be included in the hardware with the initial acquisition. The present invention addresses the problem allowing an expandable system without requiring a preexisting interconnect structure for modular components. Other features of the invention are apparent in the detailed description below with reference to the following drawings.

BRIEF DESCRIPTION OF THE DRAWINGS

The following drawings are of embodiments of the invention and not of the invention itself.

DETAILED DESCRIPTION

Figure 1:
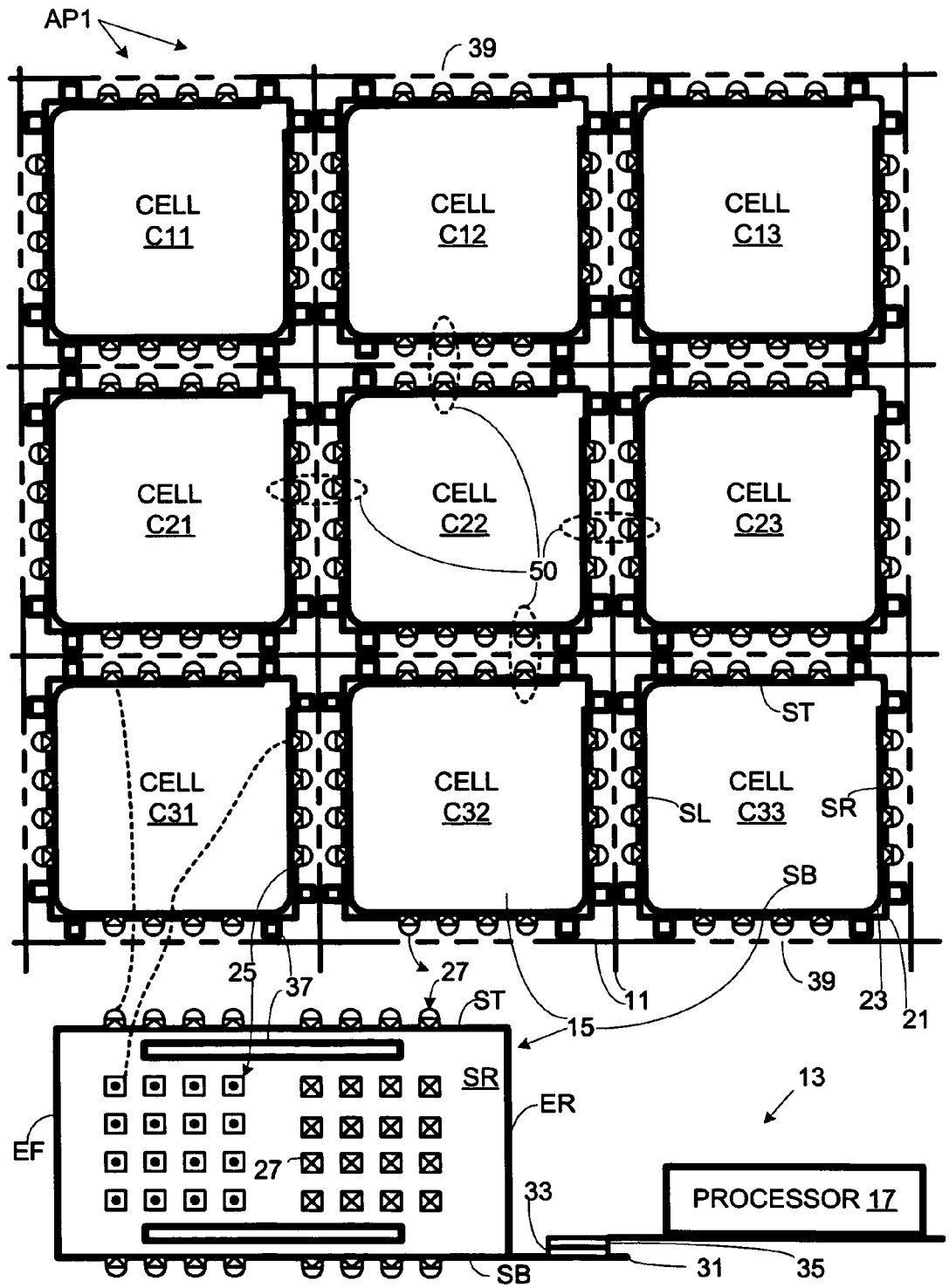
FIG. 1 is a schematic diagram of a modular computing array in accordance with an embodiment of the invention.

The present invention provides for arrays of arbitrary numbers of cells in which adjacent cells communicate optically. In FIG. 1, a 3×3 section of a larger two-dimensional square array AP1 is shown with cells C11-C33 arranged within respective square slots of a sheet metal frame 11. Cells C11-C33 are not in contact with each other, and are electrically isolated from each other. Each cell C11 has a functional component 13 and an array interface component 15.

The functional component can be a PC board with integrated circuits and other elements mounted thereon; for expository purposes a processor 17 is shown in FIG. 1. The exact nature of the components depends on the function: e.g., computation, disk storage, main memory, routing, input/output interfacing. The array interface components 15 are essentially identical. Each includes a sheet-metal sheath 21, flexible PC board 23, optical transmitters (semiconductor lasers) 25 and optical detectors 27 mounted thereon. The flexible PC board 23 is folded to define the square cross section apparent in FIG. 1. Sheath 21 holds the shape of each flexible PC board 23. Each array communications component 15 has a "tongue" 31 with an interface pad 33 for interfacing with a complementary interface pad 35 of the functional component 13. Each sheath 21 has leaf springs 37 for guiding insertion of a cell into frame 11. Apertures 39 in sheet metal frame 11 allow optical communications between adjacent cells.

Each communications component 15 has four radial sides ST, SR, SB, SL, a front end EF, and a rear end ER. The ends EF and ER are open for ventilation: the tongues and functional components protrude from rear end ER for access. Each of the four radial sides ST, SR, SB, and SL includes optical communications elements. As shown each side has a four-by-four array of photo-transmitters 25 and a four-by-four array of detectors 27. The side SR facing the reader at the bottom of FIG. 1 has the detector array toward front end EF and the transmitter array toward the respective rear end ER, as does the adjacent side ST above. The side SB shown at the very bottom of FIG. 1 has a complementary arrangement, as does the hidden radial side SL. All cells in array AP1 have two adjacent sides with detectors in front and two adjacent sides with emitters in front. This permits detectors to oppose emitters and vice versa throughout array AP1.

Figure 2:
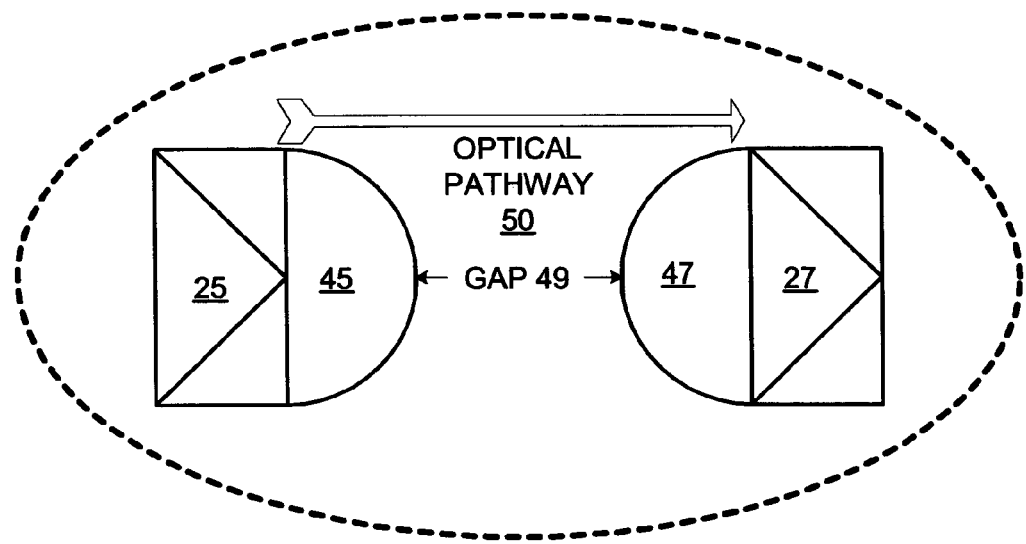
FIG. 2 is a schematic illustration of an optical pathway of the array of FIG. 1.

The emitters and detectors are photoelectric elements surface mounted onto the flexible PC boards 23. Mounted on each emitter 25 and each detector 27 is a respective plastic light pipe 45, 47, as shown in FIG. 2. An opposing emitter-detector pair defines an optical pathway 50 that extends through a respective aperture 39 through sheet metal frame 11. The light pipes for an optical intercell pathway 50 are separated by an air gap 49, which can be less than 1 millimeter (mm) apart, although longer distances can be used as well. In an alternative embodiment, there is no air gap between light pipes. In general, the spacing between the emitter and detector of a pair should be less than 10 centimeters for efficient packing of the array and to minimize the sensitivity, power, and transparency requirements for the optical elements.

Since the optical paths are short, the light pipes can be plastic (e.g., instead of glass). The light pipes can be molded. For example, the sixteen light pipes for a detector or emitter array can be molded together and mounted monolithically over the corresponding photoelectric array.

Control of the emitters and access to the detectors is had through electrical connections in the flexible PC boards, which are in turn accessed by the functional component of a cell through the mated connection pads. The emitters can be Vertical-Cavity Surface-Emitting Lasers (VCSELs) for 15.5 gigabit-per-second conductivity with milliamps of drive current. Alternatively, other types of semiconductor lasers or light-emitting diodes can be used. The frame and shrouds obviously have apertures so that the detectors can receive what the emitters transmit.

Figure 3:
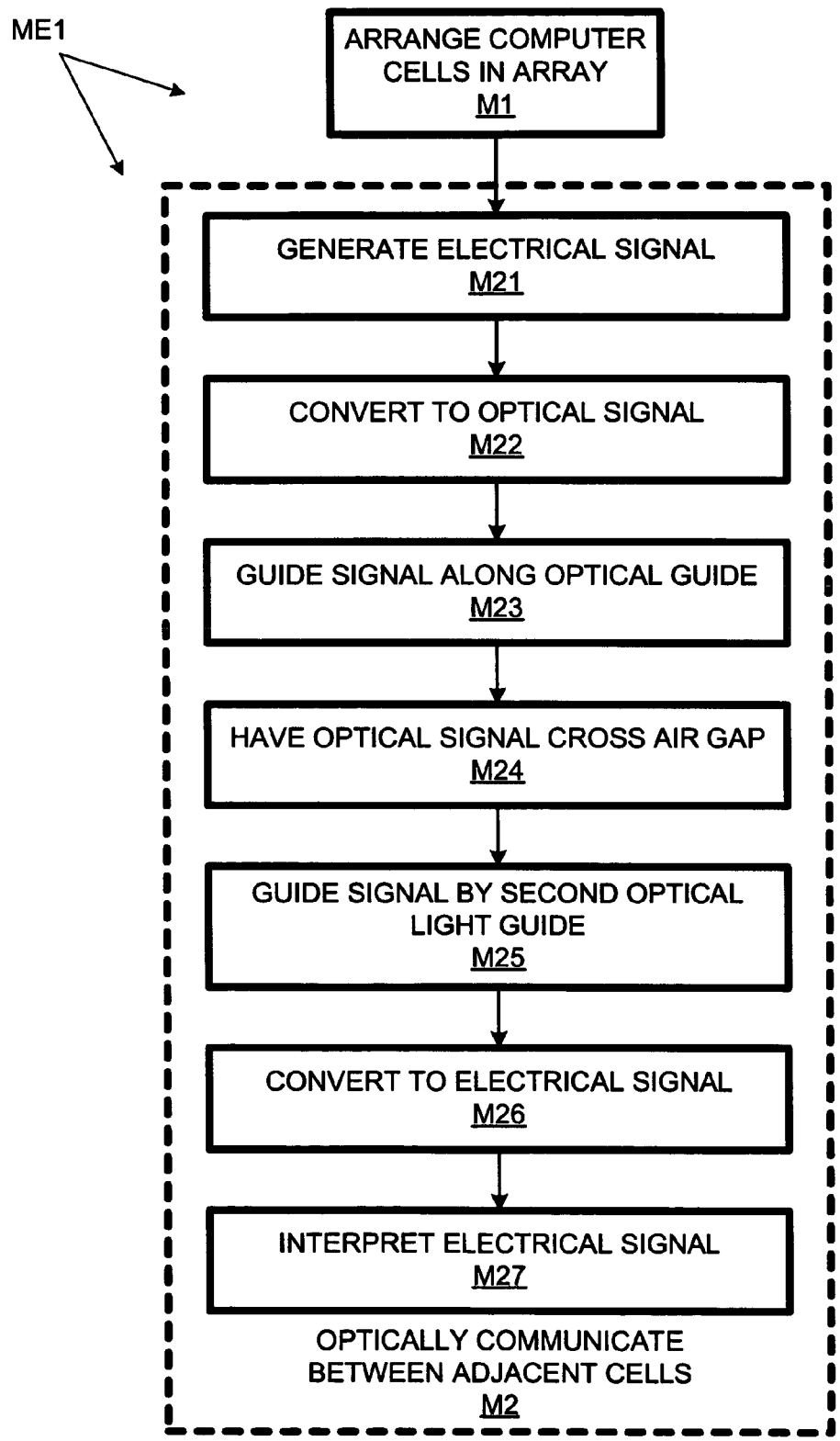
FIG. 3 is a flow chart of a method in accordance with an embodiment of the invention.

A method ME1 in accordance with an embodiment of the invention is flow-charted in FIG. 3. At method segment M1, computing cells are arranged in an array. At method segment M2, adjacent cells in the array communicate with each other via optical pathways. Method segment M2 includes method subsegments, beginning with generating an electrical signal at method segment M21, emitting an optical signal at method subsegment M22, guiding the signal using an optical guide at method subsegment M23, having the signal cross an air gap at method subsegment M24, guiding the light using another optical guide at method subsegment M25, converting the optical signal to an electrical signal at method segment M26, and interpreting the electrical signal at method segment M27. In method ME1, the distance traveled by the optical signal is less than 1 centimeter, but in other embodiments the distance can be up to 10 centimeters.

While the illustrated embodiment is a two-dimensional square array with nominally identical optical arrangements, the invention provides for many alternatives. In the case of a square array, "square" refers only to the nature of the array, e.g., an arrangement in rows and columns. The cells need not collectively define a square, as some of the array positions may not be available or may not be populated. The invention provides for other two-dimensional array geometries, e.g., hexagonal and triangular arrays. In the case of a triangular, there would be different optical arrangements for different cells. In general, any self-packing cell geometry can be employed. The invention provides for one-dimensional arrays as a special case of two-dimensional arrays.

The invention provides for three-dimensional arrays. For example, two two-dimensional arrays can be arranged front-to-front where optical arrays adorn the fronts cells such as those in FIG. 1. By using a frame for power delivery, cubic and other three-dimensional arrays are also provided for. These and other variations upon and modifications to the illustrated embodiment are provided for by the present invention, the scope of which is defined in the following claims.

What is claimed is:

1. A computer cell system comprising:
   a frame defining slots and apertures;
   plural cells inserted in said slots, said cells including first, second, and third cells, each of said cells including plural radial sides, each side of each of said cells having optical communicator assemblies, each of said optical communicator assemblies including least one photoactive element and one light-guide element; and
   plural intercell communications pathways through said apertures, said pathways including first and second pathways, each of said pathways including a pair of said optical communicator assemblies respectively from two of said cells arranged so that said cells can communicate over that pathway, the respective photoactive elements of each of said pathways being spaced a distance apart, that distance being less than 10 centimeters, a first of said optical pathways communicatively coupling said first cell and said second cell, a second of said optical pathways communicatively coupling said first cell and said third cell.

2. An array as recited in claim 1 wherein said distance is less than 1 centimeter.

3. An array as recited in claim 1 wherein said pathways include a third pathway communicatively coupling said second and third cells.

4. An array as recited in claim 1 wherein said cells further include a fourth cell, said pathways including a fourth optical pathway and a fifth optical pathway, said fourth pathway communicatively coupling said first and said fourth cells, said fifth pathway communicatively coupling said third and fourth cells, said second and fourth cells not being communicatively coupled through an optical pathway shorter than said distance.

5. An array as recited in claim 1 wherein said cells further include a fifth cell, said pathways including sixth, seventh, and eighth optical pathways, said six pathway communicatively coupling said first and said fifth cells, said seventh pathway communicatively coupling said fourth and said fifth cells, said eighth pathway communicatively coupling said fifth and second cells.

6. An array as recited in claim 1 wherein said cells are arranged in a triangular, rectangular, or hexagonal array.

7. An array as recited in claim 1 wherein said cells are electrically isolated from each other.

8. An array as recited in claim 1 wherein each of said optical pathways include an air gap between its light-guide elements.

9. An array as recited in claim 8 wherein said light-guide elements are of plastic.

10. An array as recited in claim 8 wherein said gap is less than 1 millimeter.

11. A system as recited in claim 1 wherein each of said sides of each of said cells has a two dimensional array of said photoactive elements.

* * * * *

UNITED STATES PATENT AND TRADEMARK OFFICE
CERTIFICATE OF CORRECTION

| | | |
|---|---|---|
| PATENT NO. | : 7,519,245 B2 | Page 1 of 1 |
| APPLICATION NO. | : 11/590393 | |
| DATED | : April 14, 2009 | |
| INVENTOR(S) | : Kirk M. Bresniker et al. | |

It is certified that error appears in the above-identified patent and that said Letters Patent is hereby corrected as shown below:

In column 3, line 19, in Claim 1, after "including" insert -- at --.

Signed and Sealed this

Fifteenth Day of September, 2009

David J. Kappos
*Director of the United States Patent and Trademark Office*